US006982967B1

(12) United States Patent
Leung

(10) Patent No.: US 6,982,967 B1
(45) Date of Patent: Jan. 3, 2006

(54) METHODS AND APPARATUS FOR IMPLEMENTING A PROXY MOBILE NODE IN A WIRELESS LOCAL AREA NETWORK

(75) Inventor: Kent K. Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 735 days.

(21) Appl. No.: 09/608,692

(22) Filed: Jun. 29, 2000

(51) Int. Cl.
H04L 12/26 (2006.01)
H04L 1/00 (2006.01)
H04J 1/16 (2006.01)
G08C 15/00 (2006.01)
G06F 11/00 (2006.01)

(52) U.S. Cl. ............ 370/328; 370/252; 370/338; 370/392; 709/224; 709/238

(58) Field of Classification Search ........ 370/328–375, 370/401–469; 709/202–239; 455/432–456
See application file for complete search history.

(56) References Cited

U.S. PATENT DOCUMENTS

| 4,692,918 | A |  | 9/1987 | Elliott et al. |
| 5,016,244 | A |  | 5/1991 | Massey, Jr. et al. |
| 5,018,133 | A |  | 5/1991 | Tsukakoshi et al. |
| 5,218,600 | A |  | 6/1993 | Schenkyr et al. |
| 5,371,852 | A |  | 12/1994 | Attanasio et al. |
| 5,473,599 | A |  | 12/1995 | Li et al. |
| 5,572,528 | A |  | 11/1996 | Shuen |
| 5,619,552 | A |  | 4/1997 | Karppanen et al. |
| 5,729,537 | A |  | 3/1998 | Billström |
| 5,825,759 | A |  | 10/1998 | Liu |
| 5,862,345 | A |  | 1/1999 | Okanoue et al. |
| 6,078,575 | A |  | 6/2000 | Dommety et al. |
| 6,195,705 | B1 |  | 2/2001 | Leung |
| 6,230,012 | B1 | * | 5/2001 | Willkie et al. ............... 455/435 |
| 6,272,129 | B1 | * | 8/2001 | Dynarski et al. ........... 370/356 |
| 6,308,267 | B1 | * | 10/2001 | Gremmelmaier ............ 713/168 |
| 6,339,830 | B1 |  | 1/2002 | See et al. ................... 713/202 |
| 6,396,828 | B1 | * | 5/2002 | Liu ............................. 370/352 |
| 6,466,964 | B1 | * | 10/2002 | Leung et al. ............... 709/202 |
| 6,473,413 | B1 | * | 10/2002 | Chiou et al. ................ 370/331 |

(Continued)

FOREIGN PATENT DOCUMENTS

EP  0924913 A1  6/1999

(Continued)

OTHER PUBLICATIONS

R. Droms, "*Dynamic Host Configuration Protocol*", RFC 2131, Mar. 1997, pp. 1-39.

(Continued)

Primary Examiner—Man U. Phan
(74) Attorney, Agent, or Firm—Beyer Weaver and Thomas LLP

(57) ABSTRACT

Methods and apparatus for enabling mobility of a node that does not support Mobile IP include sending a node attachment message from an access point to a Foreign Agent indicating that a node has been detected in a vicinity of the Foreign Agent. The Foreign Agent composes and sends a registration request to a Home Agent on behalf of the node. The Home Agent sends a registration reply to the Foreign Agent. The Foreign Agent then sends an attachment acknowledgment message to the access point indicating whether the node is now capable of receiving packets via the Foreign Agent. While the node is visiting the Foreign Agent, the access point redirects packets sent by the node to the Foreign Agent.

46 Claims, 10 Drawing Sheets

U.S. PATENT DOCUMENTS

| | | | |
|---|---|---|---|
| 6,496,855 B1 * | 12/2002 | Hunt et al. | 709/217 |
| 6,535,493 B1 * | 3/2003 | Lee et al. | 370/329 |
| 6,577,643 B1 * | 6/2003 | Rai et al. | 370/466 |
| 6,578,085 B1 * | 6/2003 | Khalil et al. | 709/241 |
| 6,587,882 B1 * | 7/2003 | Inoue et al. | 709/227 |
| 6,625,135 B1 * | 9/2003 | Johnson et al. | 370/332 |
| 6,651,105 B1 * | 11/2003 | Bhagwat et al. | 709/239 |
| 6,665,537 B1 * | 12/2003 | Lioy | 455/435.1 |
| 6,742,036 B1 * | 5/2004 | Das et al. | 709/226 |
| 6,795,857 B1 * | 9/2004 | Leung et al. | 709/224 |
| 2002/0026527 A1 * | 2/2002 | Das et al. | 709/245 |
| 2002/0147837 A1 | 10/2002 | Heller | |
| 2004/0024901 A1 * | 2/2004 | Agrawal et al. | 709/238 |

FOREIGN PATENT DOCUMENTS

| | | |
|---|---|---|
| EP | 0978977 A1 | 2/2000 |
| EP | 1124396 A2 | 8/2001 |

OTHER PUBLICATIONS

Li, et al "*Cisco Hot Standby Router Procotol (HSRP),*" Mar., 1998, Network Working Group RFC 2281 (http://ftp.ietf.org/rfc/rfc2281.txt?number=2281).

Release notes for 3Com Corporation, "*Conducting a Redundant Route for Network Resiliency*", Mar. 1994, *NET Builder Family Bridge/Router*, pp. 26-29.

J. Moy, "*OSPF Version 2*", RFC 1247, Jul. 19, 1991.

D. Oran, "*OSI IS-IS Intra-domain Routing Protocol*", RFC 1142, Feb. 1990.

Uyless Black, "*TCP/IP and Related Protocols*", 1992, *McGraw-Hill, Inc.*, pp. 226-249.

Chambless, et al., "*Home Agent Redundancy Protocol (HARP)*", Oct. 27, 1997.

C. Perkins, "*IP Mobility Support*", Networking Working Group, RFC 2002 Oct. 1996.

B. Adoba, et al., Network Working Group, RFC 2486 *The Network Access Identifier*, Jan., 1999.

*Mobile IP*, Release 12.0(1)T, paghes 1-55.

Montenegro, G., *Reverse Tunneling for Mobile IP*, RFC 2344, Sun Microsystems, Inc., pp. 1-19, May 1998.

D. Harkins and D. Carrel, *The Internet Key Exchange (IKE)*, Cisco Systems, pp. 1-33, Jun. 1998.

D. Cong and M. Hamlen and C. Perkins, *The Definitions of Managed Objects for IP Mobility Support using SM1v2*, RFC 2006, Motorola and IBM, pp. 1-52, Oct. 1996.

C. Finseth, *An Access Control Protocol, Sometimes Called TACACS*, RFC 1492, pp. 1-15, Sep. 13, 1992.

D. Carrel and Lol Grant, *The TACAS+ Protocol*, Network Working Group, Internet-Draft, Cisco Systems, pp. 1-42, Jan. 1997.

C. Rigney, *RADIUS Accounting*, RFC 2139, Livingston, pp. 1-25, Apr. 1997.

C. Rigney, et al., *Remote Authentication Dial in User Service (RADIUS)*, RFC 2138, pp. 1-65, Apr. 1997.

Perkins & Hobby, Network Working Group, RFC 1172, *The Point-to-Point Protocol (PPP) Intial Configuration Options*, Jul. 1990.

W. Simpson, Networking Group, RFC 1994, *PPP Challenge Handshake Authentication Protocol (CHAP)*, Aug. 1996.

R. Droms, *Dynamic Host Configuration Protocol*, RFC 2131, Mar. 1997, pp. 1-39.

Lloyd, et al., Network Working Group, RFC 1334, *PPP Authentication Protocols*, Oct. 1992.

McGregor, Network Working Group, RFC 1332, *The PPP Internet Control Protocol (IPCP)*, May 1992.

Simpson, ed., Network Working Group, RFC 1661, *The Point-to-Point Protocol (PPP)*, Jul. 1994.

Calhoun and Perkins, *Mobile IP Network Access Identifier Extension for IPv4*, Jan. 12, 2000.

Postel, J., *Simple Mail Transfer Protocol*, STD 10, RFC 821, Aug. 1982.

Crocker, D. and Overrell, P., *Augmented BNF For Syntax Specifications: ABNF*, RFC 2234, Nov. 1997.

Kent K. Leung, U.S. Appl. No. 09/227,399, "Mobile IP Authentication", filed Jan. 9, 1999.

Helmy et al., "Efficient Micro-Mobility using Intra-Domain Multicast-Based Mechanisms (M&M)", ACM SIGCOMM Computer Communications Review, vol. 32, No. 5: Nov. 2002, pp. 61-72, XP-002279254.

C. Perkins, (Editor): "IP Mobility Support, RFC 2002," Oct. 1996, 55 pages.

* cited by examiner

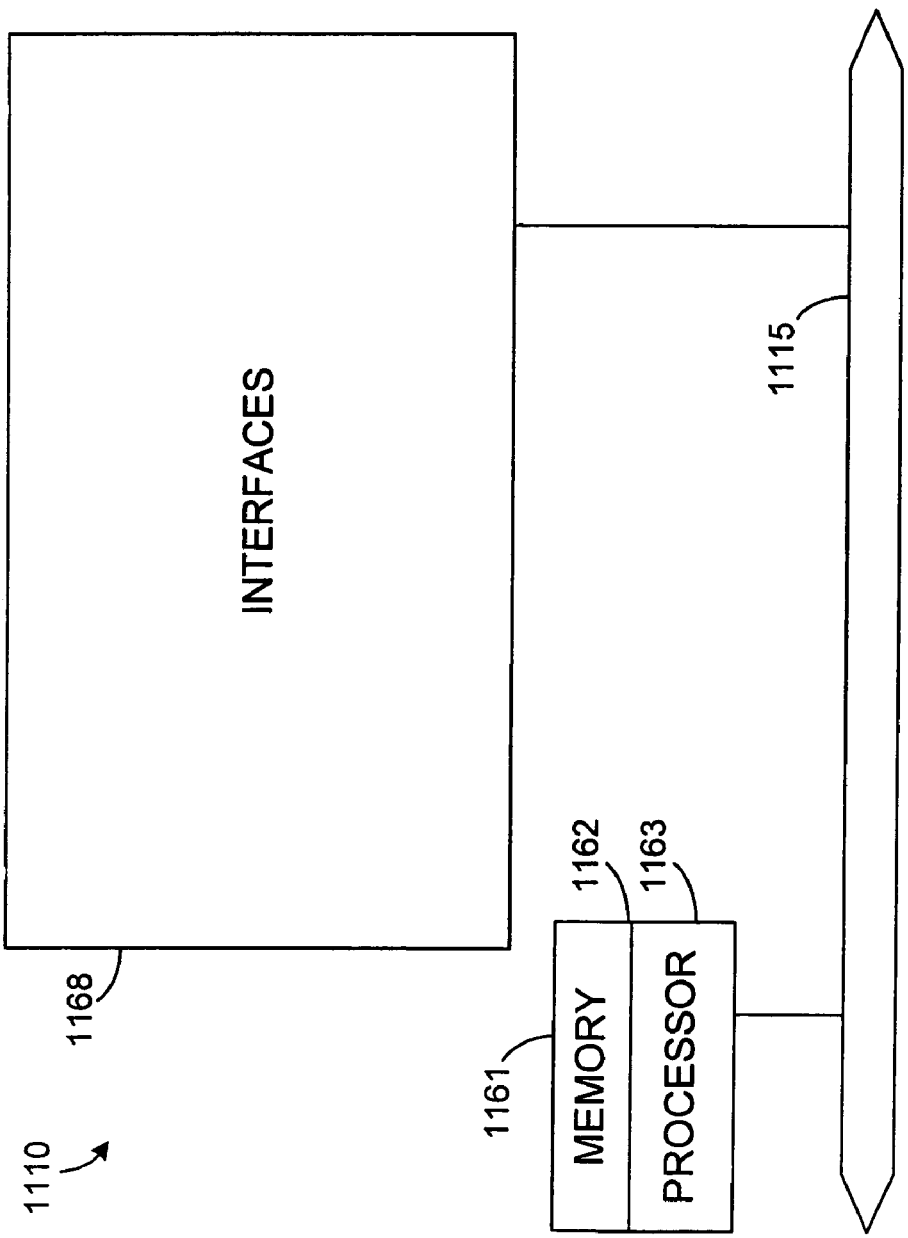

METHODS AND APPARATUS FOR IMPLEMENTING A PROXY MOBILE NODE IN A WIRELESS LOCAL AREA NETWORK

BACKGROUND OF THE INVENTION

1. Field of the Invention

The present invention relates to Mobile IP network technology. More particularly, the present invention relates to enabling mobility for a node that changes its location within a network through the use of control messages that are sent between a Foreign Agent and an access point.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile 1P Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. An output message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

It is often desirable to assign a unique IP address to each user or device within a network. Moreover various protocols enable automatic assignment of IP addresses within a particular network. For instance, in accordance with the Dynamic Host Configuration Protocol (DHCP), network administrators may manage a network centrally and automate the assignment of Internet Protocol (IP) addresses in an organization's network. More particularly, using the Internet's set of protocols (TCP/IP), each device that is capable of connecting to the Internet needs a unique IP address. When an organization sets up its computer users with a connection to the Internet, an IP address must be assigned to each machine. Without DHCP, the IP address must be entered manually at each computer and, if computers move to another location in another part of the network, a new IP address must be entered. DHCP allows a network administrator to supervise and distribute IP addresses from a central point and automatically sends a new IP address when a computer is plugged into a different location within the network.

DHCP uses the concept of a "lease" or amount of time that a given IP address will be valid for a computer. The lease time can vary depending on how long a user is likely to require the Internet connection at a particular location. DHCP is particularly useful in education and other environments where users change frequently. Using very short leases, DHCP can dynamically reconfigure networks in which there are more computers than there are available IP addresses. Thus, DHCP supports static addresses for computers containing Web servers that need a permanent IP address.

Although DHCP functions in a static environment, the assignment of a new IP address each time a computer changes its location within a network is far from ideal within a mobile environment. More particularly, when a mobile node roams to a new location within a network, it would be desirable for the node to maintain its home address. However, provisions have not been made for a node that wishes to maintain a single IP address when it changes its location within a network using DHCP. Moreover, a node that is not mobile enabled cannot currently change its location within a network using DHCP and still maintain its assigned IP address.

In view of the above, it would be desirable to provide Internet services via a wireless link for mobile users who attach to a network via a connection such as a DHCP connection. Accordingly, it would be beneficial if DHCP and Mobile IP could be integrated to provide seamless roaming capabilities. Moreover, it would be beneficial if such capabilities could be provided even where the node does not support Mobile IP.

SUMMARY OF THE INVENTION

The present invention provides proxy mobile node support for a node that changes its location within a network such as a DHCP network. This is accomplished, in part, through the use of control messages sent between an access point and a Foreign Agent. Through the use of such communication, registration and de-registration of the node with a Home Agent may be initiated. Once registered with the Home Agent, packets may be forwarded by the Home Agent to the Foreign Agent. Moreover, the access point may also redirect packets sent by the node to the Foreign Agent, enabling the redirected packets to be sent to the appropriate destination by the Foreign Agent.

In accordance with one aspect of the invention, proxy mobile node support is provided by an access point and a Foreign Agent for a node that is detected in a vicinity of the Foreign Agent. When the access point detects a node in a vicinity of a Foreign Agent, the access point sends a node attachment arrive message to the Foreign Agent. The Foreign Agent composes and sends a registration request to the Home Agent on behalf of the node. When the Foreign Agent receives a registration reply from the Home Agent, the Foreign Agent sends an attachment acknowledgement message to the access point indicating whether the node is capable of receiving packets via the Foreign Agent. For instance, when the registration is not successful, the node will be incapable of receiving packets via the Foreign Agent. However, even when the registration process is successfully completed, the Foreign Agent may have determined that the node does not have access to a subnet of the Foreign Agent. Thus, in both cases, the node will be incapable of receiving packets via the Foreign Agent.

In accordance with another aspect of the invention, the access point provides different levels of service based upon the attachment acknowledgement message received from the Foreign Agent. More particularly, when the attachment acknowledgement message is in a first state (e.g., mobile), the access point is directed to provide proxy mobile node support. When the attachment acknowledgement message is in a second state (e.g., fixed), the access point is directed to provide fixed wireless support. When the access point is directed to provide proxy mobile node to support, the access point is capable of redirecting packets sent by the node to the Foreign Agent. This is particularly important when the destination MAC address provided in a packet sent by the node specifies a MAC address of a default gateway or another Foreign Agent.

In accordance with yet another aspect of the invention, proxy mobile node support is no longer supplied when the node is no longer in a vicinity of the Foreign Agent. More particularly, when the access point detects that the node is no longer in a vicinity of the Foreign Agent, the access point sends a node attachment leave message to the Foreign Agent. The Foreign Agent may then initiate de-registration of the node, resulting in the updating of the Foreign Agent's visitor table and the Home Agent's mobility binding table. The Foreign Agent may then send an attachment acknowledgement message to the access point indicating that the node is no longer capable of receiving packets via the Foreign Agent. Since the access point is no longer redirecting packets sent by the node via the Foreign Agent, the access point may also update a remap table to free memory that is used for entries associated with that node.

BRIEF DESCRIPTION OF THE DRAWINGS

FIG. 11 is a block diagram of a network device that may be configured to implement aspects of the present invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

An invention is described herein that enables a node (e.g., a node that does not implement the Mobile IP protocol) to roam to various Foreign Agents within a network such as a DHCP supported network. This is accomplished, in part, through the use of control messages sent between the Foreign Agent to which the node is attempting to attach and an access point. For purposes of the following discussion, the term "mobile node" will be used to refer to a mobile node implementing the Mobile IP protocol while the term "node" will be used to refer to a node that does not implement the Mobile IP protocol.

Figure 1:
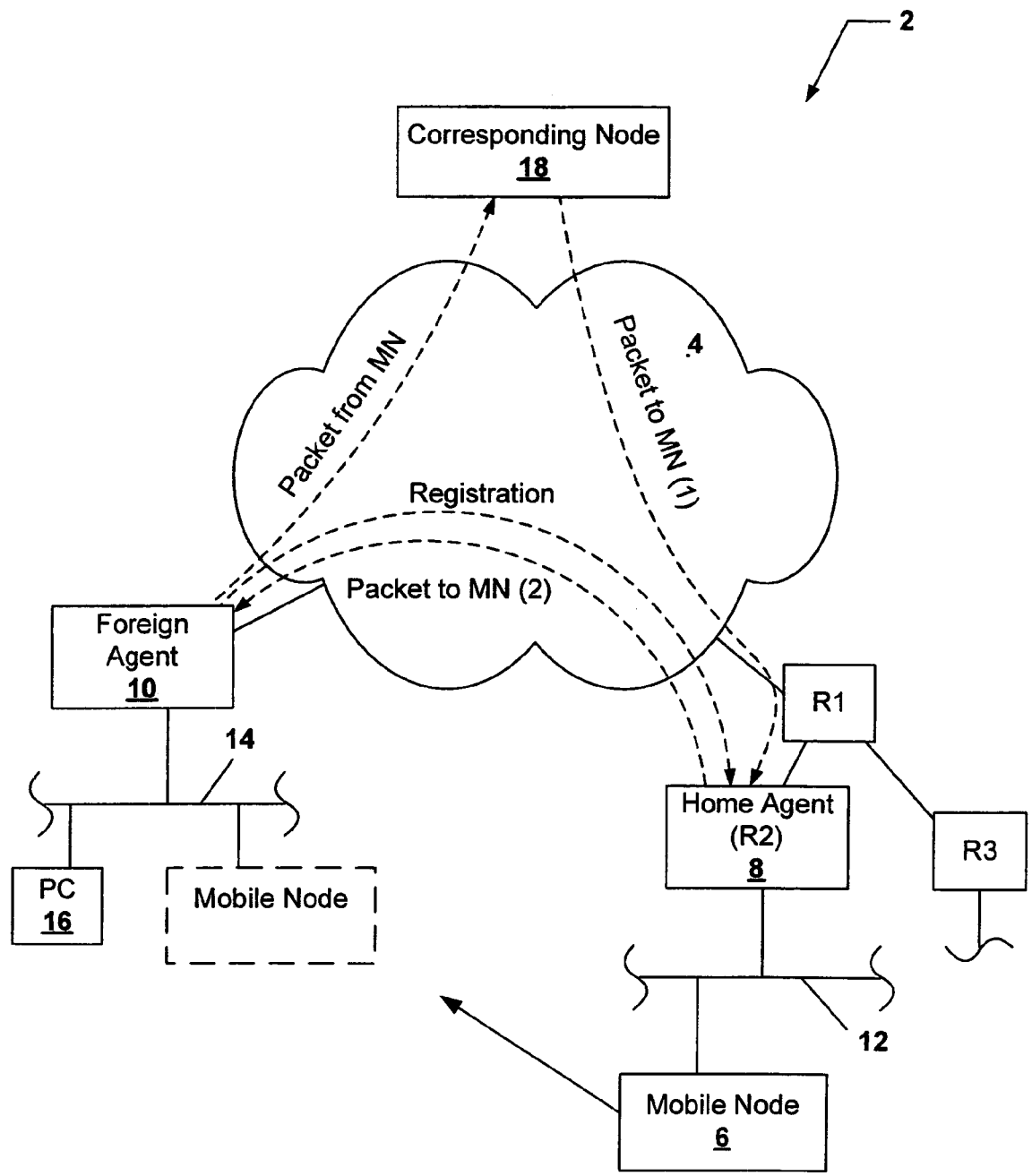
FIG. 1 is a diagram illustrating a Mobile IP network segment and associated environment.
Figure 2:
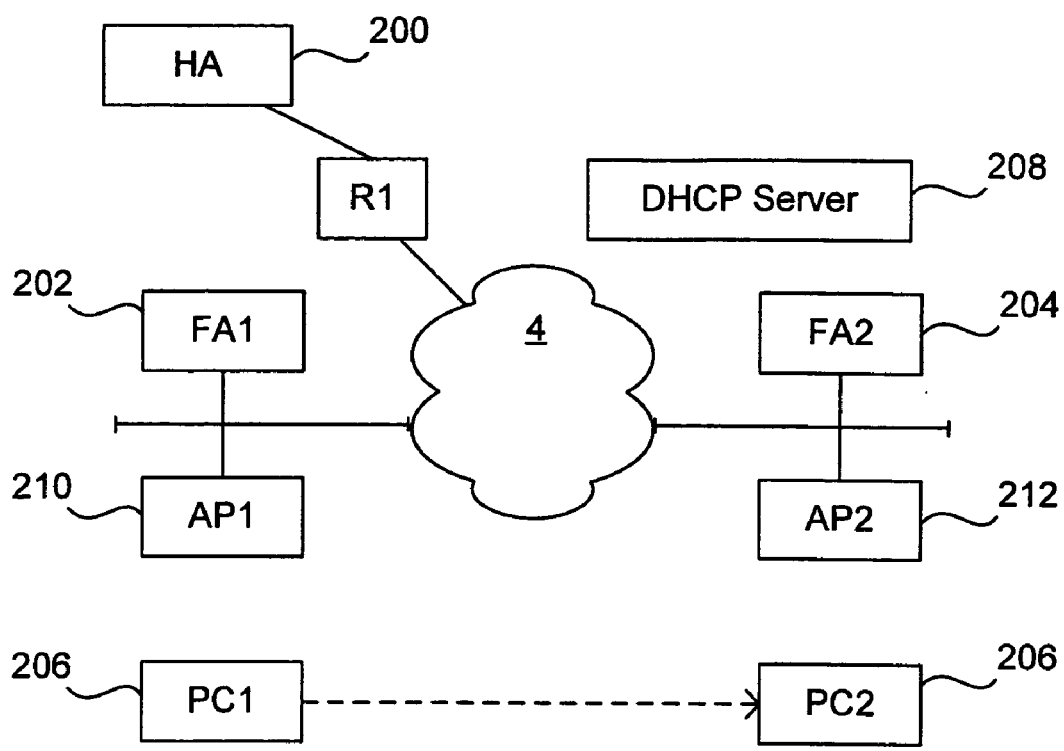
FIG. 2 is a diagram illustrating a system including a wireless LAN and DHCP server.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a non-wireless network. Typically, a mobile node implementing Mobile IP registers and de-registers with its Home Agent through the registration process. However, according to the present invention, registration is performed by the Foreign Agent on behalf of the visiting node. Similarly, de-registration may be performed by the Foreign Agent on behalf of the roaming node. For instance, node 206 that has roamed to the first Foreign Agent 202 is registered with the node's Home Agent 200 when the first Foreign Agent 202 composes and sends a registration request packet. Thus, the first Foreign Agent's visitor table and the Home Agent's mobility binding table are updated to indicate that the node has roamed to the first Foreign Agent 202. When the node 206 roams to the second Foreign Agent 204, the node 206 is de-registered (e.g., by either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent.

Three exemplary methods of detecting a node are listed here. First, a node may be detected upon receipt of an Address Resolution Protocol (ARP) request. More particularly, in order to send a packet to a destination IP address, a node must obtain the MAC address or "link-layer address" associated with the destination IP address. A node typically obtains a MAC address associated with an intended destination IP address by sending an ARP request to the Foreign Agent. Second, a node may attempt to send an actual data packet via the Foreign Agent. Thus, in this instance, the receipt of the data packet triggers the sending of a control packet (i.e., registration request packet) by the Foreign Agent. Third, an access point control packet may be received. For instance, when a device communicates with an access point, the access point sends a control packet to the Foreign Agent. Thus, once the node is detected, the Foreign Agent generates and sends a registration request to the node's Home Agent. This third method is preferred since continuously sending ARP requests and listening to data packets provides an unnecessary amount of traffic in a network having a limited bandwidth.

In accordance with one embodiment of the invention, access point control messages are used by a Foreign Agent and an access point to communicate information about the status of the node attempting to visit the Foreign Agent. More particularly, as described above, an access point control message may be sent by the access point to indicate that a node has been detected in a vicinity of the Foreign Agent and therefore has "arrived". Thus, receipt of such an access point control message by the Foreign Agent may serve to initiate the registration process. Similarly, an access point control message may indicate that the node is no longer detected in a vicinity of the Foreign Agent and therefore has "left". An exemplary format of a node attachment message (e.g., arrive or leave) will be described in further detail below with reference to FIG. 9.

As described above, when a node that is roaming wishes to send a message to a corresponding node from its new location, a message from the roaming node is packetized and forwarded through the Foreign Agent it is visiting over the internet and to the corresponding node. However, the node may have been configured for use of a particular Foreign Agent or default gateway. Thus, when the node roams, it is desirable to redirect packets sent by the node to the appropriate Foreign Agent. In accordance with one embodiment, the access point is responsible for such redirection of packets.

Since the access point redirects packets sent by the node through the appropriate Foreign Agent, it is desirable to notify the access point when registration is completed successfully (and the node is allowed to roam in a subnet of the Foreign Agent). This is important since even when registration is initiated by the Foreign Agent, the registration may be denied for a variety of reasons. Similarly, it is also desirable to notify the access point when the node is no longer visiting the Foreign Agent. Thus a control packet is sent by the Foreign Agent to the access point to indicate whether the node is mobile enabled or fixed. In other words, the control packet indicates whether the node can receive packets via the Foreign Agent. An exemplary format for an attachment acknowledgement message will be described in further detail below with reference to FIG. 10. From examining such an attachment acknowledgement message, the access point may ascertain when to start and stop redirecting packets sent by the node to the Foreign Agent.

Redirection of packets sent by the node is particularly important when the node is configured to use a particular foreign agent or default gateway. A default gateway may be configured for use by a particular node in a variety of ways. In accordance with one embodiment, two independent routers (e.g., foreign agents) function in the same chassis to seamlessly forward packets through the use of the Hot Standby Redundancy Protocol (HSRP). According to the Hot Standby Redundancy Protocol (HSRP), a protocol available from Cisco Systems, Inc. located in San Jose, Calif., an active router and a standby router share a common MAC address and IP address. In addition, each of the routers has its own unique MAC address that will be used by the router for advertising routes to other routers. One of the routers acts as the active router and it responds to Address Resolution Protocol (ARP) queries for the shared IP address with the shared MAC address. The default gateway may be configured by associating a default gateway IP address to the shared IP address. The IP to MAC binding may be either statically configured or obtained through the ARP protocol. When the active router fails, the standby router takes over both the shared IP address and the shared MAC address that was owned by the active router. Thus, a node need only know the default gateway IP address to route packets.

In order to configure the routers to support HSRP, there are three categories of information that may be configured for each router. First, there is information that must be the same for both routers. Second, there is information that must be different for both routers. Third, there is information that can be different but is recommended to be the same for both routers. One desirable configuration for a set of routers having the same interfaces is described as follows. More particularly, the configurations that need to be the same include the number of ports in each line card (i.e., router), the type of ports (e.g., type of VLAN to which each port belongs), and security information (e.g., access lists). Configurations that need to be different include the IP addresses associated with each interface of the routers. In other words, multiple routers cannot have the same IP address for a particular interface. In addition, the priorities associated with each router are different in order to enable load sharing among the different routers. Configurations that can be different but are recommended to be the same include routing protocols and routing tables associated with the routers.

Figure 3:
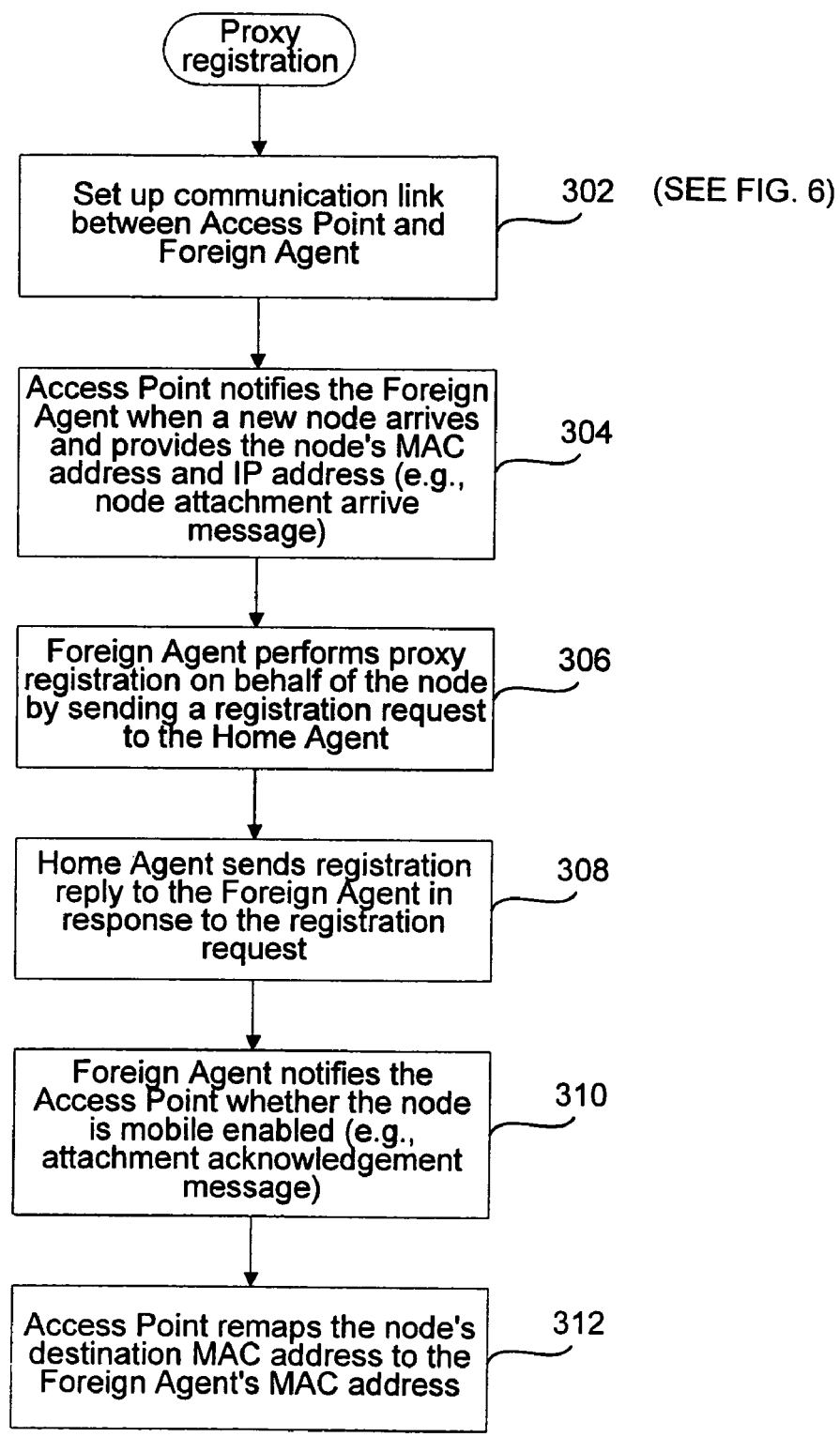
FIG. 3 is a general process flow diagram illustrating the process steps performed during registration of a node to enable mobility using control messages between a Foreign Agent and an Access Point in accordance with an embodiment of the invention.

FIG. 3 is a general process flow diagram illustrating the process steps performed to enable mobility of a node during the registration process using control messages sent between a Foreign Agent and an Access Point in accordance with an embodiment of the invention. As shown at block 302, a communication link is set up between the access point and the Foreign Agent. One method of establishing a communication link between an access point and a Foreign Agent will be described in further detail below with reference to FIG. 6. The access point then notifies the Foreign Agent when a new node arrives at block 304 by sending an access point control message. More particularly, the Foreign Agent may provide the node's MAC address as well as the IP address of the node. This may be accomplished by sending a node attachment arrive message, which will be described in further detail below with reference to FIG. 9. Since the node's MAC address is required for the node to attach to the access point, the access point will have access to the node's MAC address. However, the access point may not be configured to obtain the node's IP address. Thus, the Foreign Agent may need to obtain the node's IP address independently (e.g., from the header of a received packet).

When the Foreign Agent receives the node attachment arrive message, the Foreign Agent performs proxy registration on behalf of the node by sending a registration request to the Home Agent at block 306. The Home Agent then sends a registration reply to the Foreign Agent at block 308 in response to the registration request. The Foreign Agent may then determine whether the node is permitted to roam to the Foreign Agent (e.g., from the registration reply). Thus, the Foreign Agent may then notify the access point to indicate whether the node is capable of receiving packets via the Foreign Agent at block 310. In other words, the Foreign Agent indicates whether the node is mobile enabled. This may be accomplished by sending an attachment acknowledgement message, which will be described in further detail below with reference to FIG. 10. Once the access point is notified that the node has successfully attached to the Foreign Agent, the access point redirects packets that are sent by the node through the appropriate Foreign Agent at block 312. More particularly, this is accomplished by remapping the node's destination MAC address to the Foreign Agent's MAC address. Thus, the access point may update an entry in a remap table to indicate that packets sent from the node to a destination MAC address are to be redirected to the Foreign Agent's MAC address.

Figure 4:
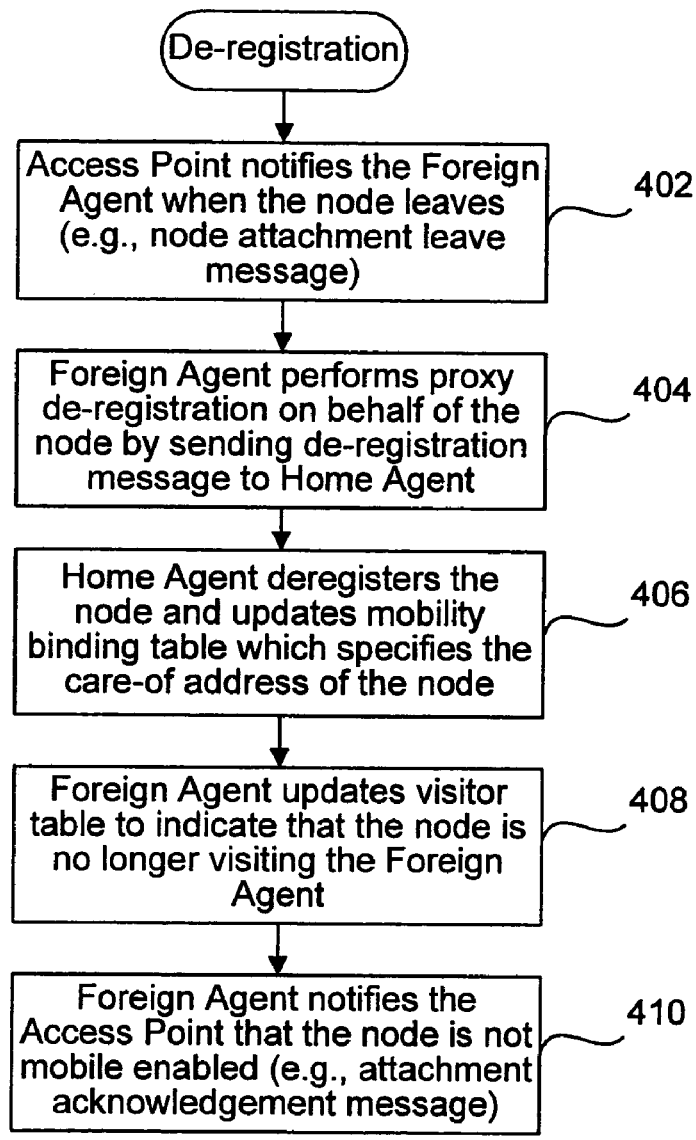
FIG. 4 is a general process flow diagram illustrating the process steps performed during de-registration of a Mobile Node using control messages between a Foreign Agent and an Access Point in accordance with an embodiment of the invention.

De-registration may be performed according to a process similar to that performed during registration. FIG. 4 is a general process flow diagram illustrating the process steps performed during de-registration of a Mobile Node using control messages between a Foreign Agent and an Access Point in accordance with an embodiment of the invention. When the node leaves (i.e., roams to another Foreign Agent), the access point notifies the Foreign Agent at block 402 to indicate that the node is no longer in a vicinity of the Foreign Agent. This may be accomplished by sending a node attachment leave message, which will be described in further detail below with reference to FIG. 9. The Foreign Agent then performs a proxy de-registration on behalf of the node by sending a de-registration message to the Home Agent at block 404. The Home Agent then de-registers the node at block 406. For instance, the Home Agent typically updates a mobility binding table which specifies the care-of address of the node when the node is de-registered. The Foreign Agent also updates its visitor table at block 408 to indicate that the node is no longer visiting the Foreign Agent. In addition, the Foreign Agent may notify the access point that d-registration has been completed at block 410. More particularly, the Foreign Agent may notify the access point that the node is no longer mobile enabled by sending an attachment acknowledgement message, which will be described in further detail below with reference to FIG. 10. For instance, the attachment acknowledgement message may be sent in order to avoid retransmission of a node attachment leave message by the access point. Since the node is no longer visiting the Foreign Agent, the access point can stop remapping packets for that node and remove associated entries from its remap table.

Figure 5:
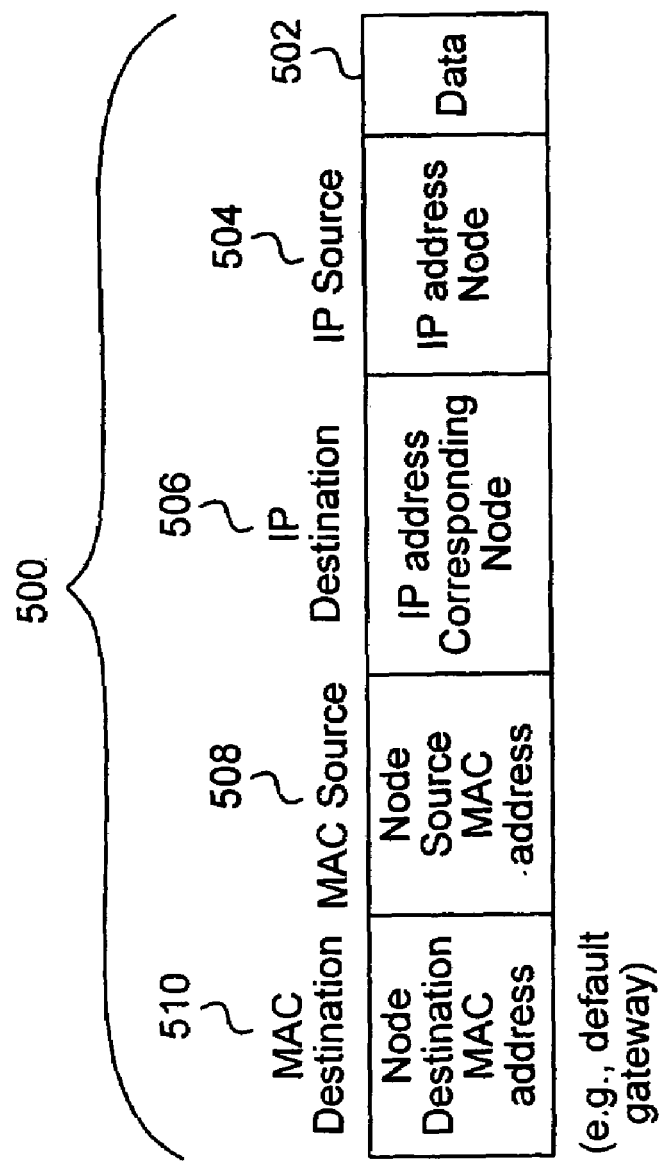
FIG. 5 is a diagram illustrating a conventional Internet Protocol header.

FIG. 5 is a diagram illustrating a conventional Internet Protocol header. As shown, header 500 of data packet 502 includes a source IP address 504 (e.g., address of the node), a destination IP address 506 (e.g., address of a corresponding node), a source MAC address 508 (e.g., MAC address of the node), and a destination MAC address 510 (e.g., default gateway MAC address). When an access point redirects a packet sent from the node to the Foreign Agent, it replaces the node destination MAC address 510 with a MAC address of the Foreign Agent the node is visiting, as appropriate. In this manner, packets sent by the node may be forwarded by the Foreign Agent to the appropriate destination IP address 506.

Figure 6:
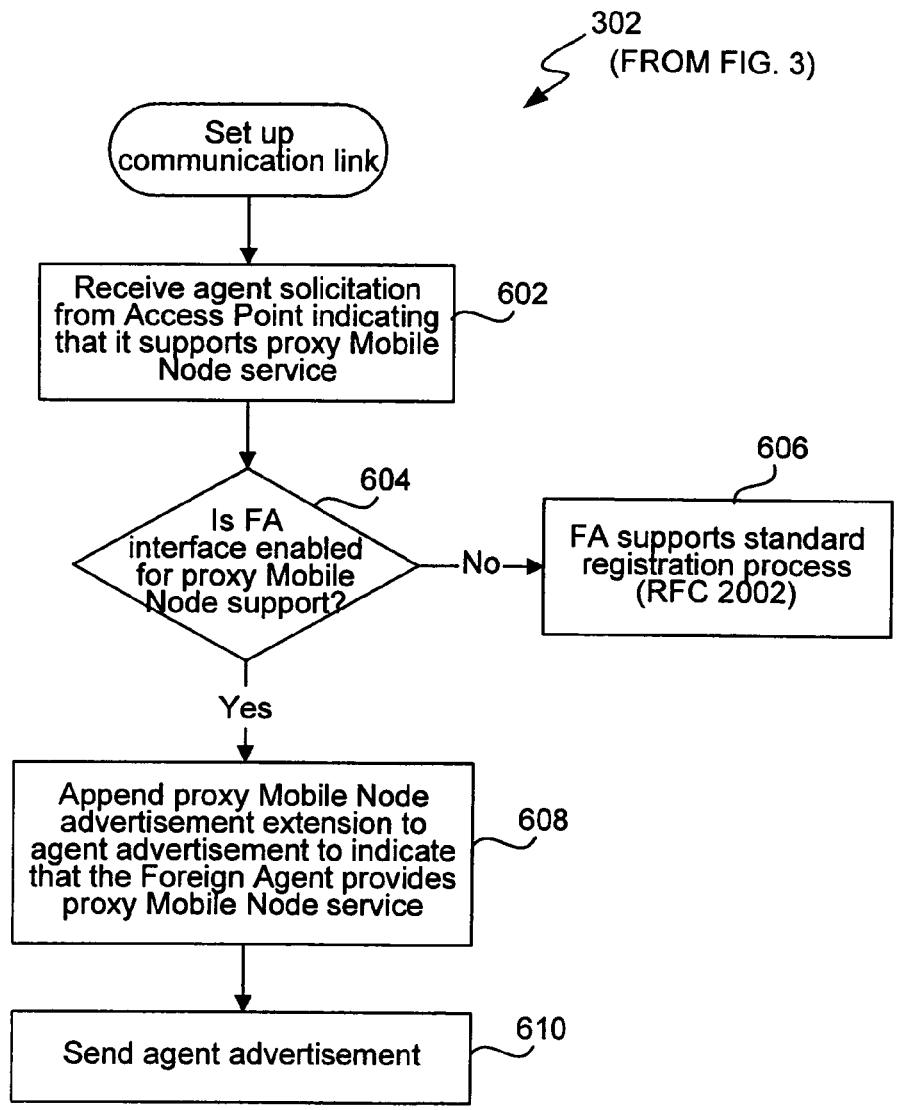
FIG. 6 is a process flow diagram illustrating a method of setting up a communication link that supports proxy Mobile Node service between an Access Point and a Foreign Agent in accordance with an embodiment of the invention.

As described above with reference to FIG. 3, a communication link is set up between an access point and a Foreign Agent. FIG. 6 is a process flow diagram illustrating a method of setting up a communication link that supports proxy Mobile Node service between an Access Point and a Foreign Agent in accordance with an embodiment of the invention. At block 602, an access point notifies a Foreign Agent that it supports proxy Mobile Node service. For instance, this may be accomplished by sending an agent solicitation such as that described below with reference to FIG. 7. If it is determined at block 604 that an interface of the Foreign Agent is not enabled for proxy Mobile Node support, the Foreign Agent supports only the standard registration process under RFC 2002 as shown at block 606. However, if the Foreign Agent is enabled for proxy Mobile Node support, the Foreign Agent notifies the access point that it provides proxy Mobile Node functionality. More particularly, as shown at block 608, a proxy Mobile Node advertisement extension may be appended to an agent advertisement to indicate that the Foreign Agent provides proxy Mobile Node service. An exemplary advertisement extension will be described in further detail with reference to FIG. 7. The agent advertisement is then sent to the access point at block 610. From this advertisement, the access point may obtain the Foreign Agent's MAC address and IP address (e.g., HSRP MAC and IP address) for future use.

Figure 7:
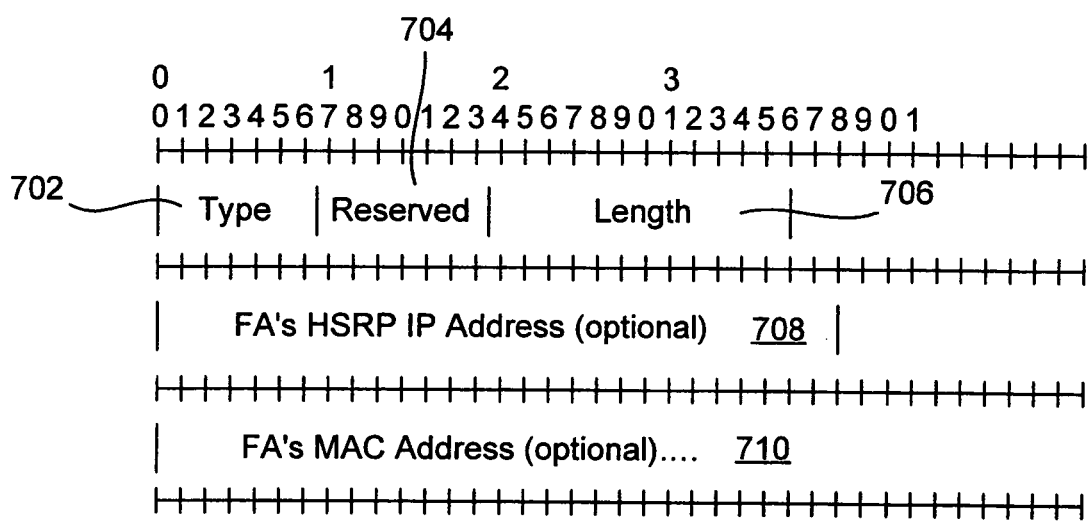
FIG. 7 is a diagram illustrating an exemplary proxy Mobile Node advertisement extension that may be appended to an agent advertisement sent by a Foreign Agent to an Access Point as shown in FIG. 6 to indicate that the Foreign Agent provides proxy Mobile Node service.

FIG. 7 is a diagram illustrating an exemplary proxy Mobile Node advertisement extension that may be appended to an agent advertisement sent by a Foreign Agent to an Access Point as shown in FIG. 6 to indicate that the Foreign Agent provides proxy Mobile Node service. A type field 702 indicates that the extension is a proxy Mobile Node advertisement. A reserved field 704 is ignored. Length field 706 is zero by default, but is nonzero when HSRP addresses are included. As shown the Foreign Agent's IP address may optionally provided in FA HSRP IP address field 708. As described above, the IP address of the Foreign Agent may be provided when HSRP is enabled. In addition, the Foreign Agent's MAC address may also be optionally provided in FA MAC address field 710. The MAC address of the Foreign Agent is similarly provided when HSRP is enabled. Thus, when HSRP is enabled on a Foreign Agent interface, the Foreign Agent will include the HSRP IP and MAC address (shared IP and MAC address) in the extension. This allows Foreign Agent redundancy. When the advertisement is received by the access point, the access point may obtain and store the HSRP IP and MAC addresses for future use.

Figure 8:
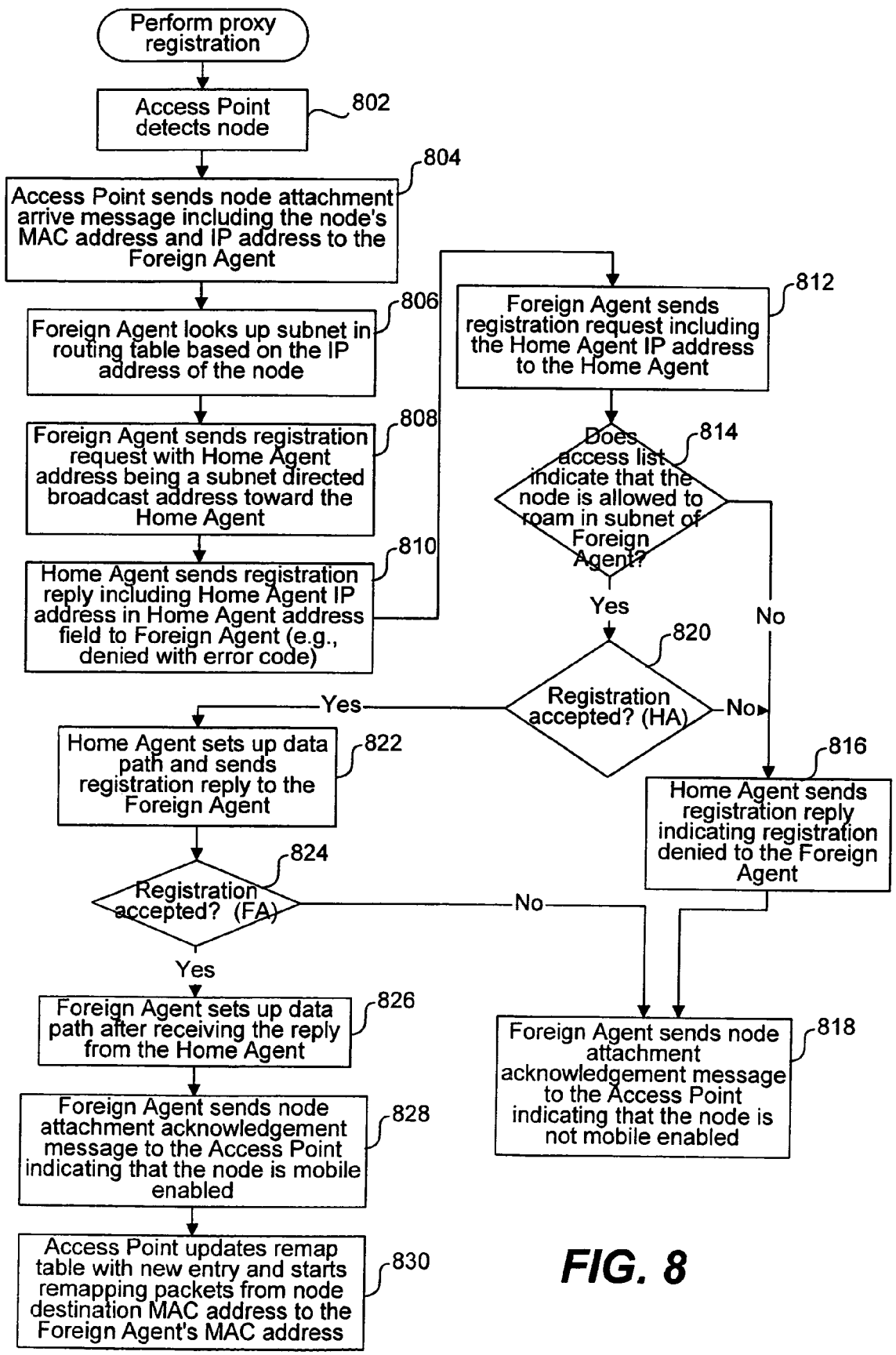
FIG. 8 is a detailed process flow diagram illustrating a method of performing proxy registration on behalf of a node in accordance with an embodiment of the invention.

FIG. 8 is a detailed process flow diagram illustrating a method of performing proxy registration on behalf of a node in accordance with an embodiment of the invention. As shown at block 802, when the access point detects a new node in a vicinity of the Foreign Agent, the access point sends an attachment arrive message to the Foreign Agent at block 804 indicating that the node has been detected in a vicinity of the Foreign Agent. More particularly, the node attachment arrive message preferably includes the node's MAC address and IP address. The Foreign Agent then performs proxy registration on behalf of the node. More particularly, the Foreign Agent sends a registration request on behalf of the node to its Home Agent. In accordance with one embodiment, the Foreign Agent determines a home subnet for the node from a routing table using an IP address of the node as shown at block 806. The Foreign Agent then sends a first registration request including a subnet directed broadcast address identifying the determined home subnet toward the Home Agent at block 808. One or more Home Agents each send a registration reply including its Home Agent IP address to the Foreign Agent at block 810. Since this first registration request merely serves to request a Home Agent address for the node, the registration reply may include an error code indicating that registration is denied. Since more than one Home Agent may reply to the requesting Foreign Agent, the Foreign Agent selects one of the replying Home Agents with which the node is to be registered. A second registration request including the IP address for the selected Home Agent is then composed and sent to the selected Home Agent at block 812.

When the Home Agent receives the registration request, it may check an access list to verify that the node is allowed to roam in a subnet of the Foreign Agent as shown at block 814. If the node is not allowed to roam in a subnet of the Foreign Agent, a registration reply indicating registration is denied is sent to the Foreign Agent at block 816. The Foreign Agent then sends a node attachment acknowledgement message to the access point indicating that the node is not mobile enabled at block 818. In this manner, the access point is notified that the node cannot receive (or send) packets via the Foreign Agent. Thus, the access point need not update its remap table at this time.

When it is determined at block 814 that the node is allowed to roam in a subnet of the Foreign Agent, the Home Agent then determines at block 820 whether registration of the node is accepted. If registration is not accepted, steps 816 and 818 are performed so that the access point is notified that the node is not mobile enabled. Otherwise, when registration is accepted, at block 822 the Home Agent sets up a data path between the Home Agent and the Foreign Agent and sends a registration reply to the Foreign Agent indicating that registration of the node is successful.

When the Foreign Agent receives the registration reply, it determines whether registration of the node with the Home Agent is successful at block 824. If registration has not been successful, the Foreign Agent sends a node attachment acknowledgement message to the access point indicating that the node is not mobile enabled at block 818. When registration is successful, the Foreign Agent sets up a data path between the Home Agent and the Foreign Agent at block 826. The Foreign Agent then sends a node attachment acknowledgement message to the access point indicating that the node is mobile enabled and therefore packets sent by the node are to be redirected by the access point as shown at block 828. The access point then updates a remap table to indicate that packets addressed to a destination MAC address (e.g., default gateway) are to be redirected to the Foreign Agent's MAC address and proceeds with redirecting packets as shown at block 830.

Figure 9:
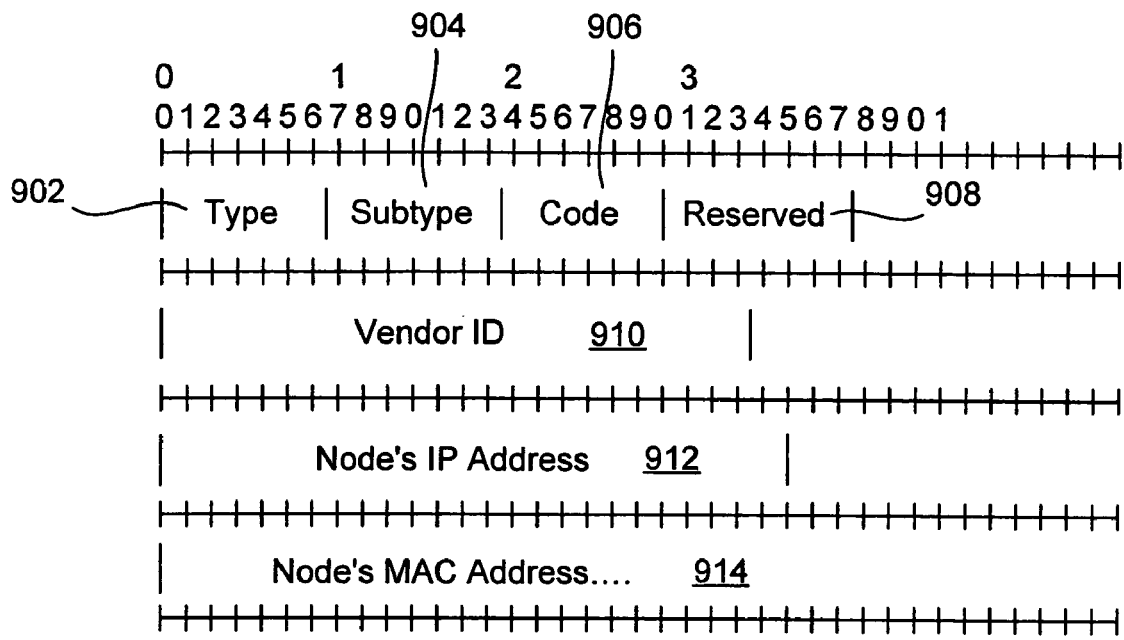
FIG. 9 is a diagram illustrating an exemplary node attachment message that may be sent by an Access Point to a Foreign Agent to notify the Foreign Agent when a node arrives or leaves.

FIG. 9 is a diagram illustrating an exemplary node attachment message that may be sent by an Access Point to a Foreign Agent to notify the Foreign Agent when a node arrives or leaves. As shown, a Mobile IP node attachment format may include a type 902 for use as a vendor specific type. In addition, a subtype 904 may indicate that this is an attachment message. More particularly, a code 906 may indicate that the node is arriving when the code is in a first state and that the node is leaving when the code is in a second state. Thus, the node attachment message may be either a node attachment arrive message or a node attachment leave message. A reserved field 908 may be used for a variety of purposes. In addition, a vendor ID field 910 may identify a vendor ID. A node ID address field 912 identifies an IP address of the node which attached to the access point and a node MAC address field 914 identifies a MAC address of the node which attached to the access point.

Figure 10:
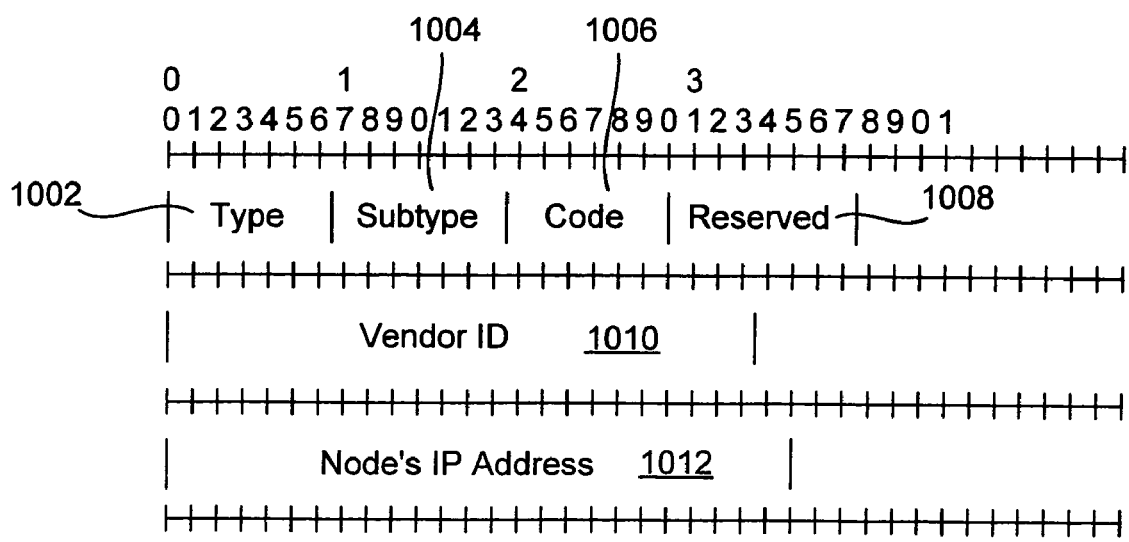
FIG. 10 is a diagram illustrating an exemplary node attachment acknowledgement format that may be sent by a Foreign Agent to an Access Point to indicate whether the node is mobile or fixed.

When the Foreign Agent receives the node attachment message, the Foreign Agent may check an access list to determine whether the source IP address is allowed to roam. An attachment acknowledgement message may then be sent to the access point. FIG. 10 is a diagram illustrating an exemplary node attachment acknowledgement format that may be sent by a Foreign Agent to an Access Point to indicate whether the node is mobile or fixed. In other words, the node attachment acknowledgement message indicates whether the node is capable of receiving packets via the Foreign Agent. A type field 1002 may be used for a vendor specific type. In addition, a subtype field 1004 may be used to indicate that this is a Mobile IP node attachment acknowledgement message. A code field 1006 may indicate that the node is fixed when in a first state and that the node is mobile when in a second state. When the node is in a fixed state, the access point provides fixed wireless connectivity. However, when the node is in a mobile state, the access point provides proxy mobility functionality (e.g., packet redirection). In addition, a reserved field 1008 may be reserved for future use. A vendor ID field 1010 may specify a vendor ID. In addition, a node IP address field 1012 may identify an IP address of the node which attached to the access point.

When the access point receives a mobile IP attachment acknowledgement message such as that illustrated in FIG. 10 and the acknowledgement message indicates that the node is mobile, the access point will start remapping the node's destination MAC address to the Foreign Agent's MAC address as appropriate. In addition, a remap table may be updated with an entry indicating that a destination MAC address specified in a packet received from the node is to be remapped to a MAC address of the Foreign Agent. In this manner, packets may be intercepted by the access point and sent via the Foreign Agent. In this manner, a node that uses DHCP may be mobile enabled. Moreover, through communication between the access point and the Foreign Agent, the use of available bandwidth is maximized. For instance, the Foreign Agent need not listen to ARPs and data packets. Moreover, the Foreign Agent need not send out gratuitous ARPs for the host's default gateway.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, Access Point and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home Agents and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration and de-registration techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISBN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration/de-registration system may be implemented on a general-purpose network host machine such as a personal computer or workstation. Further, the invention may be at least partially implemented on a card (e.g., an interface card) for a network device or a general-purpose computing device.

Referring now to FIG. 11, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 11 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Moreover, although the present invention is useful for nodes that do not support Mobile IP, the invention may also be applicable for nodes that support Mobile IP. Moreover, the present invention may be applicable in a network supported by various protocols such as DHCP. Accordingly, the present embodiments are to be considered as illustrative and not restrictive, and the invention is not to be limited to the details given herein, but may be modified within the scope and equivalents of the appended claims.

What is claimed is:

1. A Foreign Agent that supports Mobile IP, the Foreign Agent being adapted for registering a node with a Home Agent that supports Mobile IP, comprising:
   a processor; and
   a memory, the memory storing therein the following instructions:
   instructions for processing a node attachment message received from an access point, the node attachment message indicating that the node is in a vicinity of the Foreign Agent when in a first state and that the node is not in a vicinity of the Foreign Agent when in a second state;
   instructions for initiating registration on behalf of the node when the node attachment message is in the first state; and
   instructions for initiating de-registration on behalf of the node when the node attachment message is in the second state.

2. The Foreign Agent as recited in claim 1, wherein the node attachment message includes an IP address of the node that attached to the access point.

3. The Foreign Agent as recited in claim 1, further comprising:
   instructions for sending an attachment acknowledgement message to the access point, the attachment acknowledgement message indicating that the node is fixed when the attachment acknowledgement message is in a first state and indicating that the node is mobile when the attachment acknowledgement message is in a second state.

4. The Foreign Agent as recited in claim 3, wherein the attachment acknowledgement message includes an IP address of the node that attached to the access point.

5. A Foreign Agent that supports Mobile IP, the Foreign Agent being adapted for registering a node with a Home Agent that supports Mobile IP, comprising:
   a processor; and
   a memory, the memory storing therein the following instructions:
   instructions for processing a node attachment arrive message received from an access point, the node attachment arrive message indicating that the node is in a vicinity of the Foreign Agent;
   instructions for composing a registration request on behalf of the node;
   instructions for sending the registration request to the Home Agent;
   instructions for processing a registration reply received from the Home Agent in response to the registration request; and
   instructions for sending an attachment acknowledgement message to the access point indicating whether the node has been registered with the Home Agent via the Foreign Agent, thereby enabling the node to receive packets via the Foreign Agent.

6. The Foreign Agent as recited in claim 5, further comprising:
   instructions for determining from an access list whether the node is allowed to roam in a subnet of the Foreign Agent;
   wherein the attachment acknowledgement message indicates that the node has access to a subnet of the Foreign Agent when the node is allowed to roam in a subnet of the Foreign Agent and otherwise indicates that the node does not have access to a subnet of the Foreign Agent.

7. The Foreign Agent as recited in claim 5, wherein the attachment acknowledgement message indicates whether the access point is instructed to redirect packets sent by the node to a MAC address of the Foreign Agent, thereby enabling the node to send packets via the Foreign Agent.

8. The Foreign Agent as recited in claim 5, wherein the attachment acknowledgement message indicates that the access point is instructed to provide fixed wireless connectivity when in a first state and to provide proxy mobility service when in a second state.

9. The Foreign Agent as recited in claim 5, wherein the node supports Mobile IP.

10. The Foreign Agent as recited in claim 5, wherein the node does not support Mobile IP.

11. The Foreign Agent as recited in claim 5, wherein the registration request includes a MAC address and an IP address associated with the node.

12. The Foreign Agent as recited in claim 5, wherein the attachment acknowledgement message indicates that the node has been registered with the Home Agent via the Foreign Agent when the registration reply indicates that registration of the node with the Home Agent was successful, and wherein the attachment acknowledgement message otherwise indicates that the node has not been registered with the Home Agent via the Foreign Agent.

13. The Foreign Agent as recited in claim 5, further comprising:
   instructions for establishing a communication link between the Foreign Agent and the access point such that the communication link supports proxy Mobile Node service.

14. The Foreign Agent as recited in claim 13, wherein the instructions for establishing the communication link between the Foreign Agent and the access point comprise:
   instructions for processing an agent solicitation received from the access point, the agent solicitation indicating that the access point supports proxy Mobile Node service; and
   instructions for sending an agent advertisement from the Foreign Agent to the access point, the agent advertisement indicating that the Foreign Agent provides proxy Mobile Node service.

15. The Foreign Agent as recited in claim 14, wherein the agent advertisement includes an agent advertisement extension indicating that the Foreign Agent provides proxy Mobile Node service.

16. The Foreign Agent as recited in claim 15, wherein the agent advertisement extension includes an IP address field and a MAC address field for identifying an IP address and a MAC address that are shared by two or more Foreign Agents.

17. A Foreign Agent that supports Mobile IP, the Foreign Agent being adapted for registering a node with a Home Agent that supports Mobile IP, comprising:
   a processor; and
   a memory, the memory storing therein the following instructions:
   instructions for processing a node attachment arrive message received from an access point, the node attachment arrive message indicating that the node is in a vicinity of the Foreign Agent;
   instructions for composing a registration request on behalf of the node;
   instructions for sending the registration request to the Home Agent;
   instructions for processing a registration reply received from the Home Agent in response to the registration request;
   instructions for sending an attachment acknowledgement message to the access point indicating whether the node can receive packets via the Foreign Agent;
   instructions for determining a home subnet for the node from a routing table using an IP address of the node;
   instructions for sending a first registration request, the first registration request including a subnet directed broadcast address identifying the determined home subnet;
   instructions for processing a registration reply received from one or more Home Agents, each registration reply including an IP address for the associated Home Agent; and
   instructions for sending a second registration request to one of the Home Agents, the second registration request including the IP address for the one of the Home Agents.

18. The Foreign Agent as recited in claim 17, wherein the IP address of the node is assigned by a DHCP server.

19. A Foreign Agent that supports Mobile IP, the Foreign Agent being adapted for de-registering a node with a Home Agent that supports Mobile IP, comprising:
   a processor; and
   a memory, the memory storing therein the following instructions:
   instructions for processing a node attachment leave message received from an access point, the node attachment leave message indicating that the node is no longer in a vicinity of the Foreign Agent;
   instructions for composing a de-registration message on behalf of the node;
   instructions for sending the de-registration message to the Home Agent; and
   instructions for updating a visitor table to indicate that the node is no longer visiting the Foreign Agent.

20. The Foreign Agent as recited in claim 19, further comprising:
   instructions for sending an attachment acknowledgement message to the access point indicating that the node can no longer receive packets via the Foreign Agent.

21. The Foreign Agent as recited in claim 19, wherein the node supports Mobile IP.

22. The Foreign Agent as recited in claim 19, wherein the node does not support Mobile IP.

23. An access point adapted for communicating with a Foreign Agent that supports Mobile IP and adapted for redirecting packets received from a node that has registered with a Home Agent that supports Mobile IP via the Foreign Agent, comprising:
   a processor; and
   a memory, the memory storing therein the following instructions:
   instructions for detecting the node when it is in a vicinity of the Foreign Agent;
   instructions for sending a node attachment arrive message to the Foreign Agent, the node attachment arrive message indicating that the node is in a vicinity of the Foreign Agent; and
   instructions for processing an attachment acknowledgement message received from the Foreign Agent, the attachment acknowledgement message indicating whether the node has been registered with the Home Agent via the Foreign Agent, thereby enabling the node to receive packets via the Foreign Agent.

24. The access point as recited in claim 23, wherein the attachment acknowledgement message indicates that the access point is instructed to provide fixed wireless connectivity when in a first state and to provide proxy mobility service when in a second state.

25. The access point as recited in claim 23, wherein the node supports Mobile IP.

26. The access point as recited in claim 23, wherein the node does not support Mobile IP.

27. The access point as recited in claim 23, further comprising:
instructions for updating a remap table with an entry indicating that a destination MAC address specified in a packet received from the node is to be remapped to a MAC address of the Foreign Agent.

28. The access point as recited in claim 23, further comprising:
instructions for intercepting a packet addressed from the node to a destination MAC address; and
instructions for redirecting the packet to a MAC address of the Foreign Agent.

29. The access point as recited in claim 23, further comprising:
instructions for sending a node attachment leave message to the Foreign Agent, the node attachment leave message indicating that the node is no longer in a vicinity of the Foreign Agent.

30. The access point as recited in claim 29, further comprising:
instructions for processing an attachment acknowledgement message received from the Foreign Agent, the attachment acknowledgement message indicating that the node is no longer registered with the Home Agent via the Foreign Agent.

31. The access point as recited in claim 29, further comprising:
instructions for removing an entry from a remap table, the entry indicating that packets addressed from the node to a destination MAC address are to be remapped to a MAC address of the Foreign Agent.

32. A computer-readable medium storing thereon computer-readable instructions for registering a node visiting a Foreign Agent that supports Mobile IP with a Home Agent that supports Mobile IP, comprising:
instructions for processing a node attachment message received from an access point, the node attachment message indicating that the node is in a vicinity of the Foreign Agent when in a first state and that the node is not in a vicinity of the Foreign Agent when in a second state;
instructions for initiating registration on behalf of the node when the node attachment message is in the first state; and
instructions for initiating de-registration on behalf of the node when the node attachment message is in the second state.

33. A computer-readable medium storing thereon computer-readable instructions for registering a node that is visiting a Foreign Agent that supports Mobile IP with a Home Agent that supports Mobile IP, comprising:
instructions for processing a node attachment arrive message received from an access point, the node attachment arrive message indicating that the node is in a vicinity of the Foreign Agent;
instructions for composing a registration request on behalf of the node;
instructions for sending the registration request to the Home Agent;
instructions for processing a registration reply received from the Home Agent in response to the registration request; and
instructions for sending an attachment acknowledgement message to the access point indicating whether the node has been registered with the Home Agent via the Foreign Agent, thereby enabling the node to receive packets via the Foreign Agent.

34. A computer-readable medium storing thereon computer-readable instructions for de-registering a node that was visiting a Foreign Agent that supports Mobile IP with a Home Agent that supports Mobile IP, comprising:
instructions for processing a node attachment leave message received from an access point, the node attachment leave message indicating that the node is no longer in a vicinity of the Foreign Agent;
instructions for composing a de-registration message on behalf of the node;
instructions for sending the de-registration message to the Home Agent; and
instructions for updating a visitor table to indicate that the node is no longer visiting the Foreign Agent.

35. A Foreign Agent that supports Mobile IP, the Foreign Agent being adapted for registering a node with a Home Agent that supports Mobile IP, comprising:
means for processing a node attachment message received from an access point, the node attachment message indicating that the node is in a vicinity of the Foreign Agent when in a first state and that the node is not in a vicinity of the Foreign Agent when in a second state;
means for initiating registration on behalf of the node when the node attachment message is in the first state; and
means for initiating de-registration on behalf of the node when the node attachment message is in the second state.

36. A Foreign Agent that supports Mobile IP, the Foreign Agent being adapted for registering a node with a Home Agent that supports Mobile IP, comprising:
means for processing a node attachment arrive message received from an access point, the node attachment arrive message indicating that the node is in a vicinity of the Foreign Agent;
means for composing a registration request on behalf of the node;
means for sending the registration request to the Home Agent;
means for processing a registration reply received from the Home Agent in response to the registration request; and
means for sending an attachment acknowledgement message to the access point indicating whether the node is registered with the Home Agent via the Foreign Agent, thereby enabling the node to receive packets via the Foreign Agent.

37. A Foreign Agent that supports Mobile IP, the Foreign Agent being adapted for de-registering a node with a Home Agent that supports Mobile IP, comprising:
means for processing a node attachment leave message received from an access point, the node attachment leave message indicating that the node is no longer in a vicinity of the Foreign Agent;
means for composing a de-registration message on behalf of the node;

means for sending the de-registration message to the Home Agent; and means for updating a visitor table to indicate that the node is no longer visiting the Foreign Agent.

38. An access point adapted for communicating with a Foreign Agent that supports Mobile IP and being adapted for redirecting packets received from a node that has registered with a Home Agent that supports Mobile IP via the Foreign Agent, comprising:

means for detecting the node when it is in a vicinity of the Foreign Agent;

means for sending a node attachment arrive message to the Foreign Agent, the node attachment arrive message indicating that the node is in a vicinity of the Foreign Agent; and means for processing an attachment acknowledgement message received from the Foreign Agent, the attachment acknowledgement message indicating whether the node is registered with the Home Agent via the Foreign Agent, thereby enabling the node to receive packets via the Foreign Agent.

39. The access point as recited in claim 23, wherein the attachment acknowledgement message further indicates whether the node has access to a subnet of the Foreign Agent.

40. The computer-readable medium as recited in claim 33, wherein the attachment acknowledgement message further indicates whether the node has access to a subnet of the Foreign Agent.

41. The Foreign Agent as recited in claim 36, wherein the attachment acknowledgement message further indicates whether the node has access to a subnet of the Foreign Agent.

42. The access point as recited in claim 38, wherein the attachment acknowledgement message further indicates whether the node has access to a subnet of the Foreign Agent.

43. In a Foreign Agent that supports Mobile IP, a method of initiating registration of a node with a Home Agent that supports Mobile IP, comprising:

receiving a node attachment message received from an access point, the node attachment message indicating that the node is in a vicinity of the Foreign Agent when in a first state and that the node is not in a vicinity of the Foreign Agent when in a second state;

processing the node attachment message received from the access point;

initiating registration on behalf of the node when the node attachment message is in the first state; and initiating de-registration on behalf of the node when the node attachment message is in the second state.

44. In a Foreign Agent that supports Mobile IP, a method of registering a node with a Home Agent that supports Mobile IP, comprising:

receiving a node attachment arrive message received from an access point, the node attachment arrive message indicating that the node is in a vicinity of the Foreign Agent;

processing the node attachment arrive message received from the access point;

composing a registration request on behalf of the node;

sending the registration request to the Home Agent;

processing a registration reply received from the Home Agent in response to the registration request; and sending an attachment acknowledgement message to the access point indicating whether the node has been registered with the Home Agent via the Foreign Agent, thereby enabling the node to receive packets via the Foreign Agent.

45. In a Foreign Agent that supports Mobile IP, a method of de-registering a node with a Home Agent that supports Mobile IP, comprising:

receiving a node attachment leave message received from an access point, the node attachment leave message indicating that the node is no longer in a vicinity of the Foreign Agent;

processing the node attachment leave message received from the access point;

composing a de-registration message on behalf of the node;

sending the de-registration message to the Home Agent; and updating a visitor table to indicate that the node is no longer visiting the Foreign Agent.

46. In an access point adapted for communicating with a Foreign Agent that supports Mobile IP and adapted for redirecting packets received from a node that has registered with a Home Agent that supports Mobile IP via the Foreign Agent, a method of registering the node with the Home Agent, comprising:

detecting the node when it is in a vicinity of the Foreign Agent;

sending a node attachment arrive message to the Foreign Agent, the node attachment arrive message indicating that the node is in a vicinity of the Foreign Agent; and processing an attachment acknowledgement message received from the Foreign Agent, the attachment acknowledgement message indicating whether the node has been registered with the Home Agent via the Foreign Agent, thereby enabling the node to receive packets via the Foreign Agent.

* * * * *